US009247421B2

(12) United States Patent
Cho et al.

(10) Patent No.: US 9,247,421 B2
(45) Date of Patent: Jan. 26, 2016

(54) MOBILE DEVICE, CONTENT DELIVERY APPARATUS, CONTENT PROVIDING APPARATUS AND CONTROL METHOD THEREOF

(75) Inventors: Hyung-rae Cho, Seoul (KR); Sun-ae Kim, Seoul (KR); Hyun-joo Oh, Seoul (KR); Ji-young Kwahk, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 1348 days.

(21) Appl. No.: 12/912,301

(22) Filed: Oct. 26, 2010

(65) Prior Publication Data

US 2011/0106878 A1   May 5, 2011

(30) Foreign Application Priority Data

Oct. 30, 2009   (KR) .................. 10-2009-0104432

(51) Int. Cl.
  *G06F 15/16*   (2006.01)
  *H04W 8/24*   (2009.01)
  *G06Q 30/02*   (2012.01)
  *H04W 4/00*   (2009.01)
  *H04W 88/02*   (2009.01)

(52) U.S. Cl.
  CPC ............ *H04W 8/24* (2013.01); *G06Q 30/02* (2013.01); *H04W 4/00* (2013.01); *H04W 88/02* (2013.01)

(58) Field of Classification Search
  USPC ........................................... 709/203
  See application file for complete search history.

(56) References Cited

U.S. PATENT DOCUMENTS

| 8,131,875 | B1* | 3/2012 | Chen et al. .................... 709/246 |
| 8,254,892 | B2* | 8/2012 | Chien ....................... 455/414.1 |
| 2005/0249987 | A1 | 11/2005 | McLean |
| 2007/0078928 | A1 | 4/2007 | Yang et al. |
| 2007/0161402 | A1* | 7/2007 | Ng. et al. .................... 455/554.2 |
| 2007/0214245 | A1* | 9/2007 | Hamalainen et al. ......... 709/223 |

(Continued)

FOREIGN PATENT DOCUMENTS

| CN | 101286173 | 10/2008 |
| EP | 1 770 959 | 4/2007 |

(Continued)

OTHER PUBLICATIONS

English translation of JP 2008-282295, Nov. 20, 2008, Casio Hitachi Mobile Communications Co Ltd.*

(Continued)

*Primary Examiner* — Tu Nguyen
(74) *Attorney, Agent, or Firm* — The Farrell Law Firm, P.C.

(57) ABSTRACT

A mobile device, a content delivery apparatus, a content providing apparatus and a control method thereof are provided. The mobile device includes a communication unit that performs communication with an external environment, a signal processor that processes signals transmitted and received through the communication unit, and a display unit that displays an image based on a signal processed by the signal processor. The mobile device also includes a controller that controls the communication unit to transmit a profile corresponding to a request to a content delivery apparatus when the request for the profile is received from the content delivery apparatus located within a predetermined zone, and to receive content corresponding to the transmitted profile. Customized contents can be provided to the mobile device on the basis of a user's profile.

52 Claims, 13 Drawing Sheets

(56) References Cited

U.S. PATENT DOCUMENTS

| 2008/0249987 | A1 | 10/2008 | Ogasawara |
| 2009/0019033 | A1 | 1/2009 | Lee et al. |
| 2009/0227290 | A1 | 9/2009 | Chien |
| 2009/0251277 | A1* | 10/2009 | O'Hara et al. ............ 340/5.1 |

FOREIGN PATENT DOCUMENTS

| JP | 2002-108757 | 4/2002 |
| JP | 2002-157505 | 5/2002 |
| JP | 2004-013195 | 1/2004 |
| JP | 2006-228174 | 8/2006 |
| JP | 2007-128589 | 5/2007 |
| JP | 2007-312045 | 11/2007 |
| JP | 2008-204397 | 9/2008 |
| JP | 2008-226014 | 9/2008 |
| JP | 2008-282295 | 11/2008 |
| JP | 2009-519624 | 5/2009 |
| JP | 2009-187176 | 8/2009 |
| JP | 2009-530669 | 8/2009 |
| KR | 1020070037017 | 4/2007 |
| KR | 1020080091045 | 10/2008 |
| KR | 1020090006464 | 1/2009 |
| KR | 1020090041484 | 4/2009 |
| WO | WO 2007/109541 | 9/2007 |
| WO | WO 2007/130150 | 11/2007 |

OTHER PUBLICATIONS

Japanese Office Action dated Oct. 28, 2014 issued in counterpart application No. 2012-536671.
Australian Examination Report dated Nov. 11, 2014 issued in counterpart application No. 2010314013.
Chinese Office Action dated Dec. 9, 2014 issued in counterpart application No. 201080049119.8.
Close Up, Nikkei Business Publications, Inc., No. 727, pp. 46-52, 2009.
IEICE Technical Report, Data Engineering, The Institute of Electronics, Information and Communication Engineers, vol. 109, No. 153, Jul. 28, 2009.
Australian Examination Report dated Mar. 16, 2015 issued in counterpart application No. 2010314013.

* cited by examiner

MOBILE DEVICE, CONTENT DELIVERY APPARATUS, CONTENT PROVIDING APPARATUS AND CONTROL METHOD THEREOF

PRIORITY

This application claims priority under 35 U.S.C. §119(a) to Korean Patent Application No. 10-2009-0104432, filed on Oct. 30, 2009 in the Korean Intellectual Property Office, the disclosure of which is incorporated herein by reference.

BACKGROUND OF THE INVENTION

1. Field of the Invention

The present invention relates generally to a mobile device, a content delivery apparatus, a content providing apparatus and a control method thereof, and more particularly to a mobile device, a content delivery apparatus, a content providing apparatus and a control method thereof, in which customized contents can be provided to the mobile device based on a user's profile.

2. Description of the Related Art

A content provider can provide various contents to a mobile device through a network. The content provider has difficulty providing contents that are customized for a profile of a user who uses a certain mobile device since it has to transmit contents to a plurality of mobile devices. The plurality of mobile devices may be divided into groups and contents may be transmitted differently in accordance with the groups. However, it still remains difficult to provide the customized contents.

SUMMARY OF THE INVENTION

The present invention has been made to address at least the above problems and/or disadvantages and to provide at least the advantages described below. Accordingly, an aspect of the present invention provides a mobile device, a content delivery apparatus, a content providing apparatus and a control method thereof, in which customized contents can be provided to the mobile device on the basis of a user's profile.

According to one aspect of the present invention, a mobile device is providing having a communication unit that performs communication with an exterior, a signal processor that processes signals transmitted and received through the communication unit, and a display unit that displays an image based on a signal processed by the signal processor. The mobile device also includes a controller that controls the communication unit to transmit a profile corresponding to a request to a content delivery apparatus when the request for the profile is received from the content delivery apparatus located within a predetermined zone, and to receive content corresponding to the transmitted profile.

According to another aspect of the present invention, a content delivery apparatus is provided that includes a communication unit that performs communication with an external environment, a signal processor that processes signals transmitted and received through the communication unit, and a display unit that displays an image based on a signal processed by the signal processor. The apparatus also includes a controller that controls the communication unit to request and receive a profile from a mobile device when the mobile device is sensed within a predetermined zone, and to transmit the received profile to a content providing apparatus, which includes at least one content.

According to an additional aspect of the present invention, a content providing apparatus is provided that includes a communication unit that performs communication with an external environment, and a storage unit that stores at least one content. The apparatus also includes a controller that controls the storage unit to store a profile of a mobile device when the profile is received from a content delivery apparatus through the communication unit, and to select content corresponding to the received profile from among the stored at least one content.

According to a further aspect of the present invention, a method of controlling a mobile device is provided. A request for a profile is received from a content delivery apparatus located in a predetermined zone. The profile is transmitted to the content delivery apparatus. Content corresponding to the profile is received. The received content is displayed.

The method may further include transmitting the profile to a content providing apparatus comprising at least one content.

The method may further include transmitting a changed profile to the content providing apparatus if the profile is changed.

The method may further include determining whether to receive the contents in accordance with characteristics of the contents.

According to still another aspect of the present invention, a method of controlling a content delivery apparatus is provided. It is determined whether a mobile device is sensed within a predetermined zone. A profile of the mobile device is requested when the mobile device is sensed within the predetermined zone. The profile from the mobile device is received. The received profile is transmitted to a content providing apparatus that includes at least one content.

The method may further include receiving contents corresponding to the profile from the content providing apparatus; and transmitting the received contents to the mobile device. The method may further include requesting contents related to an image being displayed in a display unit to be transmitted among contents corresponding to the received profile.

Additionally, according to another aspect of the present invention a method of controlling a content providing apparatus is provided. At least one content is stored in a storage unit. A profile of a mobile device is received from a content delivery apparatus through a communication unit. The received profile is stored in the storage unit. Content corresponding to the received profile is selected from among the stored at least one content.

The method may further include transmitting the selected contents to the content delivery apparatus.

BRIEF DESCRIPTION OF THE DRAWINGS

The above and/or other aspects, features and advantages of the present invention will become apparent from the following detailed description when taken in conjunction with the accompanying drawings, in which.

DETAILED DESCRIPTION OF EMBODIMENTS OF THE PRESENT INVENTION

Figure 1:
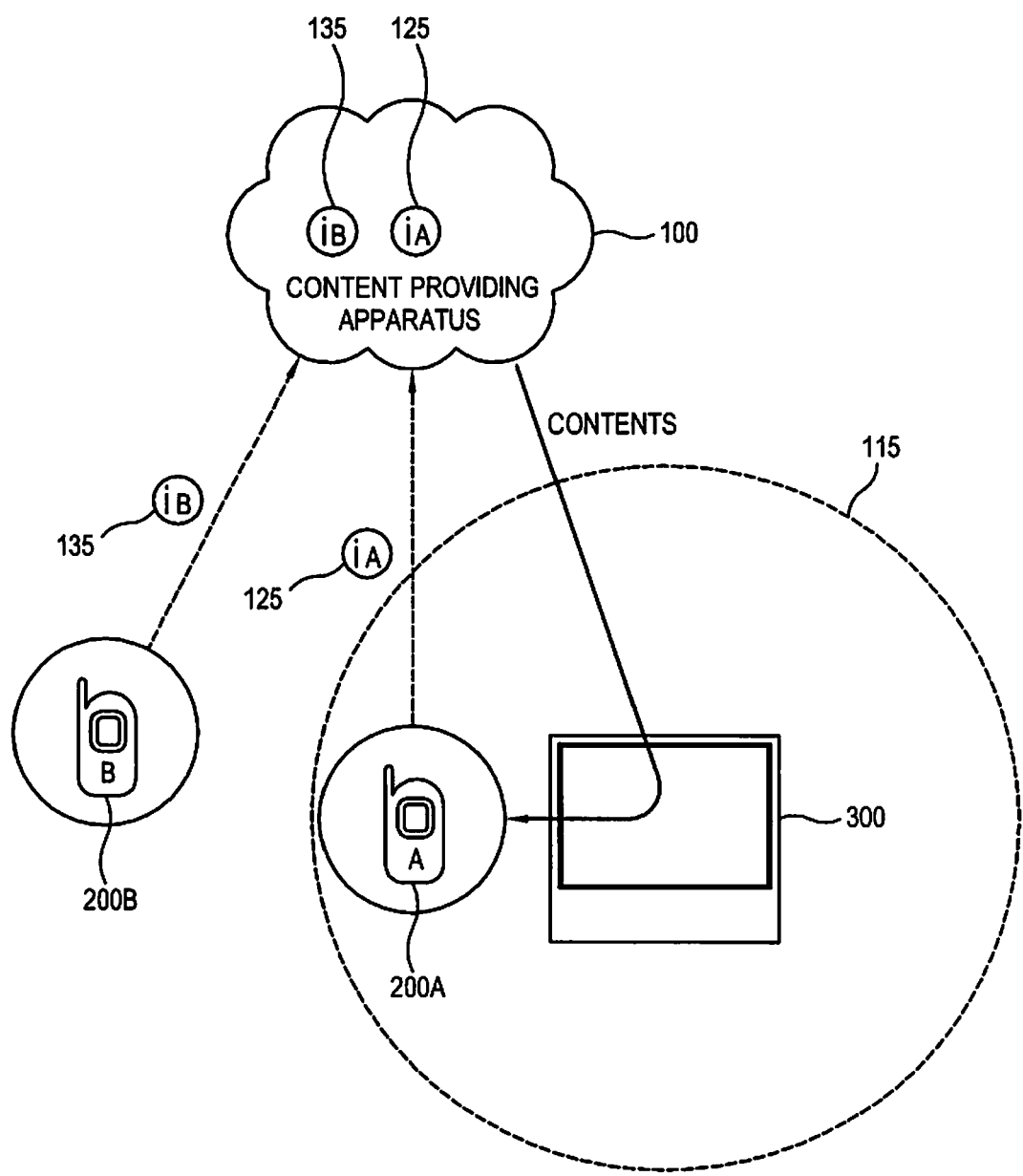
FIG. 1 is a diagram illustrating a configuration of a network including a mobile device, a content delivery apparatus and a content providing apparatus, according to an embodiment of the present invention.

Embodiments of the present invention are described in detail with reference to accompanying drawings. Similar components may be designated by similar reference numerals although they are illustrated in different drawings. Detailed descriptions of constructions or processes known in the art may be omitted to avoid obscuring the subject matter of the present invention.

FIG. 1 is a diagram illustrating a configuration of a network including a mobile device, a content delivery apparatus and a content providing apparatus, according to an embodiment of the present invention.

Mobile device 'A' 200A and mobile device 'B' 200B previously register profiles 125 and 135 of users to a content providing apparatus 100 so that they may receive contents from a content delivery apparatus 300. The content providing apparatus 100 manages the user's profiles 125 and 135 and relevant information in the form of database.

If the mobile device 'A' 200A enters a predetermined zone 115 with respect to the content delivery apparatus 300, the content delivery apparatus 300 recognizes the mobile device 'A' 200A. The content delivery apparatus 300 requests and receives the profile from the mobile device 'A' 200A.

The content delivery apparatus 300 acquires contents corresponding to the profile of the mobile device 'A' 200A from the content providing apparatus 100. The content delivery apparatus 300 transmits the acquired contents to the mobile device 'A' 200A.

Meanwhile, the mobile device 'B' 200B is placed out of the predetermined zone 115 with respect to the content delivery apparatus 300, so that the content delivery apparatus 300 cannot recognize the mobile device 'B' 200B. Thus, the mobile device 'B' 200B cannot receive contents from the content delivery apparatus 300.

Figure 2:
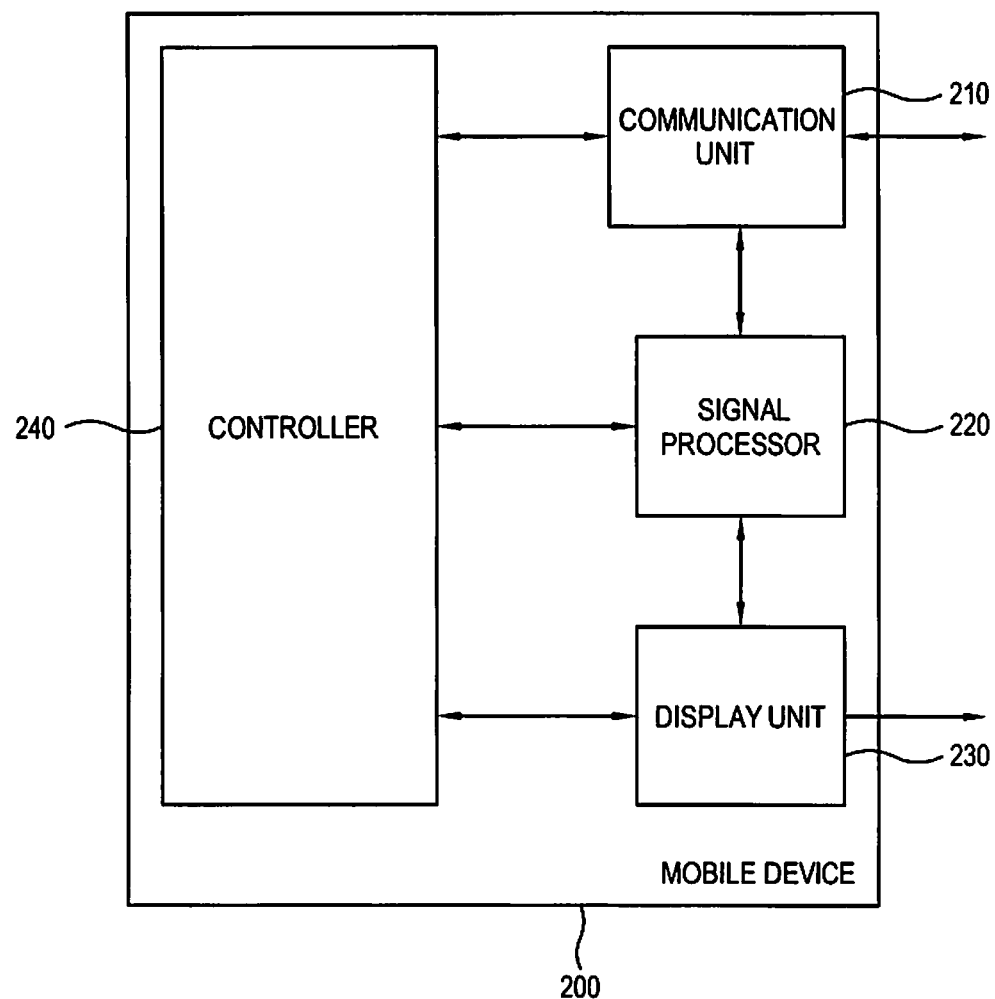
FIG. 2 is a block diagram illustrating a configuration of the mobile device, according to an embodiment of the present invention.

FIG. 2 is a block diagram illustrating a configuration of the mobile device, according to an embodiment of the present invention.

In this embodiment, the mobile device 200 may be a mobile terminal, a Personal Digital Assistant (PDA), a Moving Picture experiment group audio layer-3 (MP3) player, a laptop computer, etc. Any electronic device can be employed as the mobile device 200 according to an embodiment of the present invention as long as it is portable and capable of communicating with a server or peripheral devices.

The mobile device 200 in this embodiment includes a communication unit 210, a signal processor 220, a display unit 230 and a controller 240.

The communication unit 210 can communicate with an external environment. For example, through the communication unit 210 the mobile device 200 can communicate with the content delivery apparatus 300 and/or the content providing apparatus 100. Specifically, the communication unit 210 may perform communication based on Bluetooth, ZigBee, a wireless Local Area Network (WLAN), etc. To this end, the communication unit 210 may include a module for Bluetooth, ZigBee, and/or WLAN.

The signal processor 220 can process a signal transmitted and received by the communication unit 210. Specifically, the signal processor 220 may encode, decode and modulate a signal.

The display unit 230 can display an image based on a signal processed by the signal processor 220. The display unit 230 may include a display panel achieved by a Liquid Crystal Display (LCD), an Organic Light Emitting Display (OLED), a Plasma Display Panel (PDP), etc.

The controller 240 can control the communication unit 210 to transmit a profile to the content delivery apparatus 300 when receiving a request for the profile from the content delivery apparatus 300 placed within a predetermined zone. The controller 240 may control the communication unit 210 to receive contents corresponding to the profile from the content delivery apparatus 300 that acquires the contents corresponding to the profile through the content providing apparatus 100 having at least one content. Also, the controller 240 may control the communication unit 210 to receive contents corresponding to the profile from the content providing apparatus 100 that has at least one content.

The controller 240 controls the communication unit 210 to transmit the profile to the content providing apparatus 100, thereby previously registering the profiles. Further, if the profile is changed, the controller 240 controls the communication unit 210 to transmit the changed profile to the content providing apparatus 100, thereby updating the profile registered in the content providing apparatus 100.

The controller 240 can determine whether to receive the contents in accordance with characteristics of the contents. The characteristics of the contents may include the amount, kind and subject of the contents. For example, the controller 240 determines whether to receive the contents based on the amount of the contents, and thus controls the communication unit 210 to receive only the contents having a predetermined amount or less, without receiving the contents exceeding the predetermined amount. The controller may also determine whether to receive the contents on the basis of the kind of the contents, and thus controls the communication unit 210 not to receive advertisements or the like, but to receive firmware, etc., related to functions of the mobile device 200.

The profile may include at least one of preference, interest and private information of a user and characteristic information of the mobile device 200. Further, the contents may include at least one of an advertisement, a Graphic User Interface (GUI) linked to another content, a moving picture, an image, an audio and a text.

Figure 3:
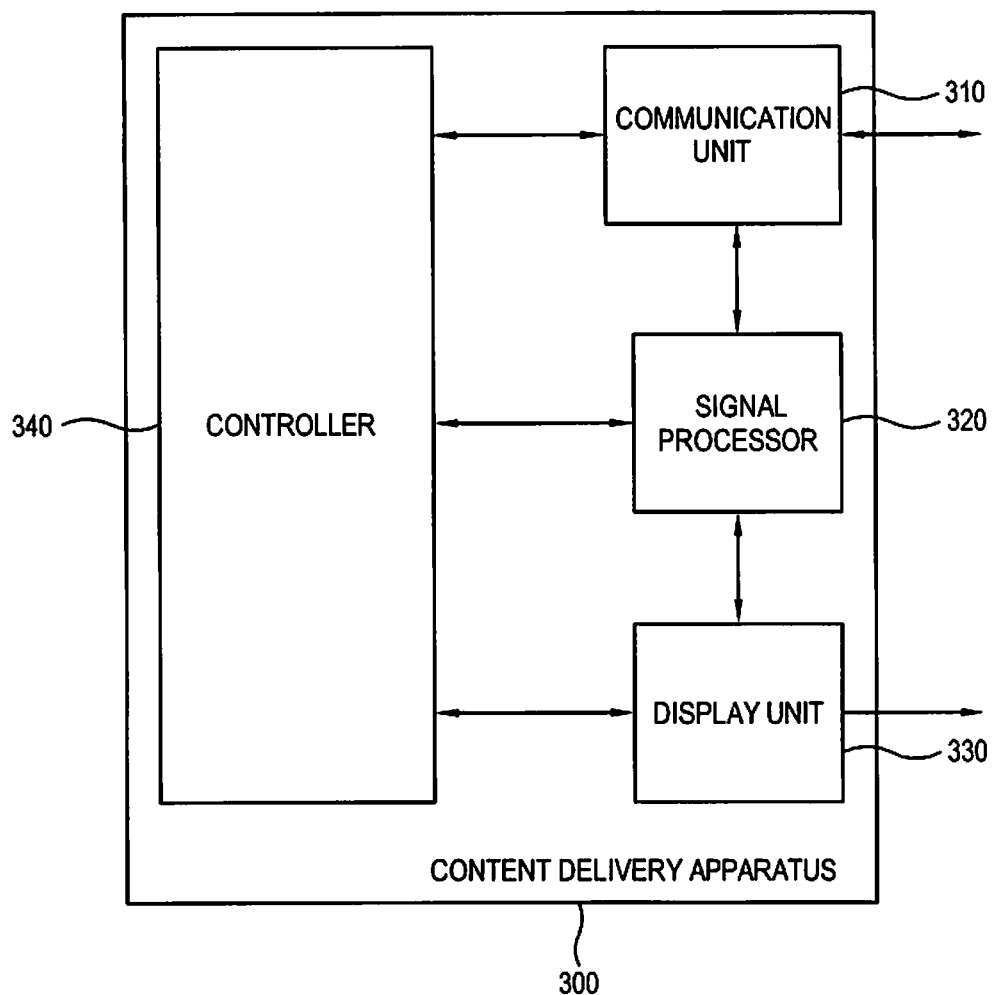
FIG. 3 is a block diagram illustrating a configuration of the content delivery apparatus, according to an embodiment of the present invention.

FIG. 3 is a block diagram illustrating a configuration of the content delivery apparatus, according to an embodiment of the present invention.

The content delivery apparatus 300, according to an embodiment, includes a display apparatus with a display unit 330 capable of displaying an image. For example, the content delivery apparatus 300 may include a Large Format Display (LFD), a vending machine, a Digital Information Display (DID), etc.

In this embodiment of the present invention, the content delivery apparatus 300 includes a communication unit 310, a signal processor 320, the display unit 330 and a controller 340.

The communication unit 310 can communicate with an external environment. Specifically, the communication unit 310 can sense or recognize the mobile device 200 placed in within a predetermined zone. The communication unit 310 may include Bluetooth, ZigBee, WLAN or similar communication modules for performing communication based on Bluetooth, ZigBee, a WLAN, etc., to sense or recognize the mobile device 200.

The signal processor 320 can process a signal transmitted and received by the communication unit 310.

The display unit 330 can display an image based on a signal processed by the signal processor 320. The display unit 330 may include a display panel achieved by an LCD, an OLED, a PDP, etc.

The controller 340 can control the communication unit 310 to request and receive a profile from the mobile device 200 when sensing the mobile device 200 within a predetermined zone, and to transmit the received profile to the content providing apparatus 100 having at least one content.

Further, the controller 340 can control the communication unit 310 to receive the contents corresponding to the profile from the content providing apparatus 100, and to transmit the received contents to the mobile device 200. When the profile of the mobile device 200 is transmitted to the content providing apparatus 100, the controller 340 may control the communication unit 310 to request the contents corresponding to the profile and transmit the requested contents to the mobile device 200.

The characteristics of the contents may include at least one of the amount, kind and subject of the contents. Also, the profile may include at least one of preference, interest and private information of a user and characteristic information of the mobile device 200. Further, the contents may include at least one of an advertisement, a GUI linked to another content, a moving picture, an image, an audio and a text. Further, the content may include contents related to an image displayed on the display unit 330. For example, if the display unit 330 is displaying an advertisement image for advertising certain goods, the controller 340 may control the communication unit 310 to request and receive the contents (e.g., an image, text, manufacturer, etc. of the advertising goods), related to the displayed advertisement image among the contents corresponding to the profile received from the mobile device 200, from the content providing apparatus 100 and transmit it to the mobile device 200.

According to an embodiment of the present invention, the controller 340 may control the communication unit 310 to transmit the contents to at least one of the mobile device 200 and one or more peripheral devices connected to the mobile device 200, in accordance with the characteristics of the contents. For example, in accordance with the amount of contents, a relatively-small amount of contents is transmitted to the mobile device 200, but a relatively-large amount of contents is transmitted to the peripheral devices connected to the mobile device 200. Information about the peripheral devices connected to the mobile device 200 may be given through the profile.

According to another embodiment of the present invention, the controller 340 may control the communication unit 310 to transmit different kinds of contents according to the characteristics of the mobile device 200. For example, if the mobile device 200 is a mobile terminal, the controller 340 may control the communication unit 310 to transmit the contents in the form of an image or a text. Also, if the mobile device 200 is a laptop computer, the controller 340 may control the communication unit 310 to provide a Uniform Resource Locator (URL) or homepage address where the contents exist.

Figure 4:
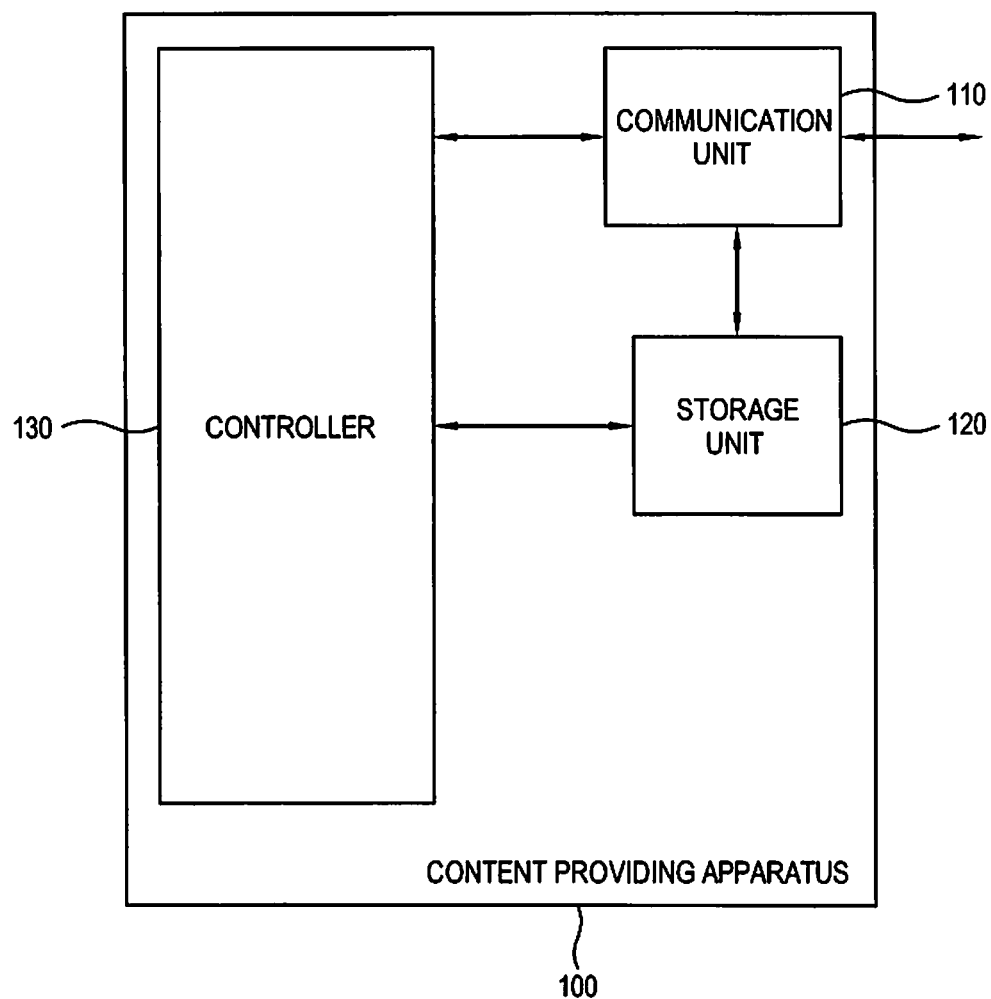
FIG. 4 is a block diagram illustrating a configuration of the content providing apparatus, according to an embodiment of the present invention.

FIG. 4 is a block diagram illustrating a configuration of the content providing apparatus, according to an embodiment of the present invention.

The content providing apparatus 100 is an apparatus including at least one content and providing at least one of the contents to the mobile device 200 or the content delivery apparatus 300, which can be achieved by a server or a web server, for example.

The content providing apparatus 100 includes a communication unit 110, a storage unit 120 and a controller 130. The communication unit 110 can communicate with an external environment. Through the communication unit 110, the content providing apparatus 100 can communicate with the mobile device 200 or the content delivery apparatus 300. Specifically, the communication unit 110 can perform communication based on a WLAN. The communication unit 110 may include a WLAN communication module, or the like.

The storage unit 120 stores at least one content. The contents may include at least one of an advertisement, a GUI linked to another content, a moving picture, an image, an audio and a text.

The storage unit 120 stores the profile of the mobile device 200 received from the mobile device 200 or the content delivery apparatus 300, and the stored profile may be managed in the form of a database. Further, if a changed profile is received from the mobile device 200, the profile stored in the storage unit 120 may be updated with the changed profile.

If the profile of the mobile device 200 is received from the content delivery apparatus 300 through the communication unit 110, the controller 130 controls the storage unit 120 to store the received profile, and selects the contents corresponding to the received profile among the at least one contents stored in the storage unit 120. The controller 130 may select the kind of contents on the basis of information about the characteristics of the mobile device 200 included in the profile when selecting the contents corresponding to the profile.

The controller 130 controls the communication unit 110 to transmit the selected contents to the content delivery apparatus 300. The controller 130 also controls the communication unit 110 to transmit the selected contents to the mobile device 200 if requested by the content delivery apparatus 300 to transmit the contents corresponding to the profile to the mobile device 200.

Figure 5A:
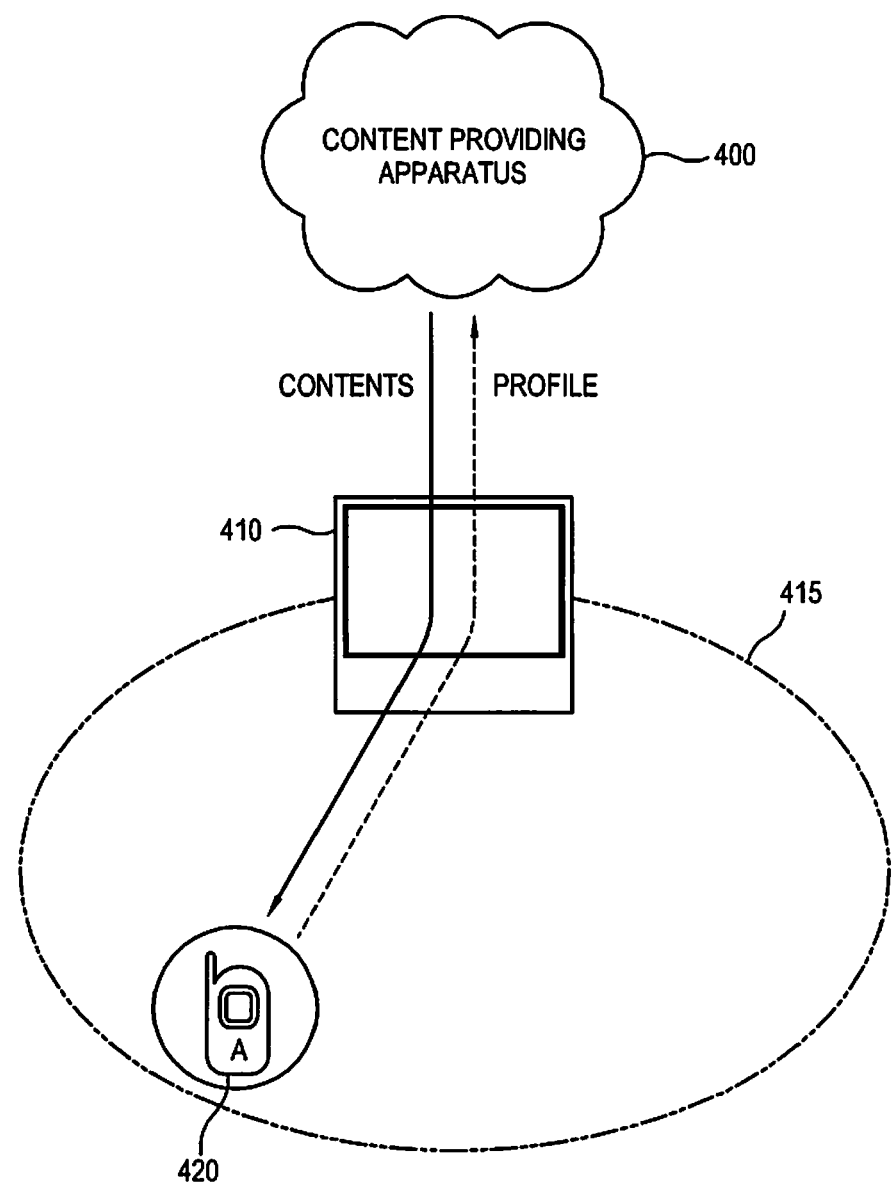
FIGS. 5A and 5B are diagrams illustrating a content providing method, according to embodiments of the present invention.

FIG. 5A is a diagram illustrating a content providing method, according to an embodiment of the present invention.

In this embodiment of the present invention, a content delivery apparatus 410 recognizes a mobile device 'A' 420 located within a predetermined zone 415 and delivers contents to the recognized mobile device 'A' 420.

If the mobile device 'A' 420 is located within the predetermined zone 415 with respect to the content delivery apparatus 410, the content delivery apparatus 410 recognizes the mobile device 'A' 420.

The content delivery apparatus 410 reads the profile of the mobile device 'A' 420. Specifically, the content delivery apparatus 410 requests and thus receives the profile from the mobile device 'A' 420.

The content delivery apparatus 410 requests a content providing apparatus 400 to transmit the profile received from the mobile device 'A' 420 and at least one content corresponding to the profile. The content providing apparatus 400, requested to transmit the profile of the mobile device 'A' 420 and the contents, selects at least one content corresponding to the profile of the mobile device 'A' 420 among the at least one previously stored contents, and transmits the selected contents to the content delivery apparatus 410.

According to an embodiment of the present invention, if the content delivery apparatus recognizes an approach of the mobile device without a user's separate action or regardless of a user's intention, customized contents are transmitted.

Further, the contents are transmitted to the mobile device based on the profile of the mobile device, so that individually customized contents can be simultaneously provided to a plurality of users, respectively.

Figure 5B:
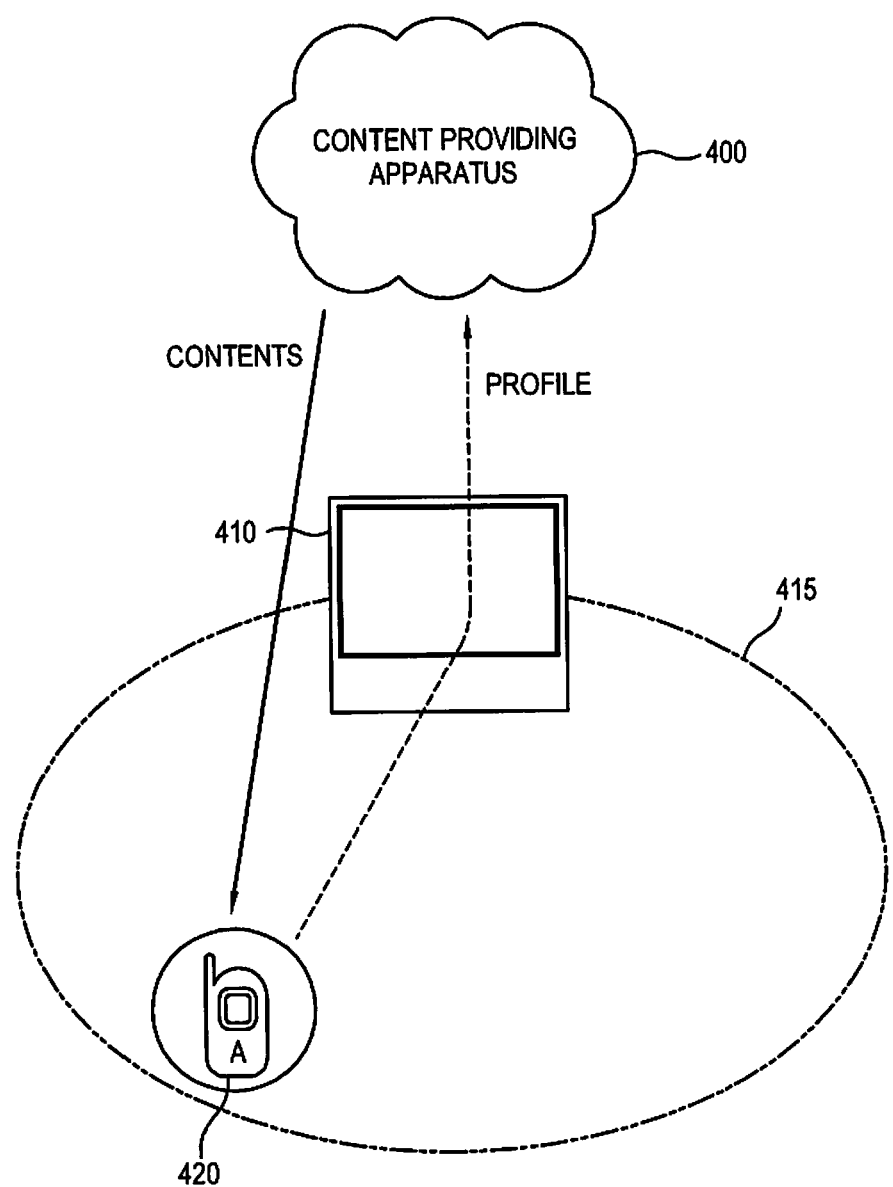

FIG. 5B is a diagram illustrating a content providing method, according to another embodiment of the present invention.

As opposed to the foregoing embodiment shown in FIG. 5A, the mobile device 'A' 420 in this embodiment of FIG. 5B directly receives the contents from the content providing apparatus 400.

Specifically, the content delivering apparatus 410 recognizes the mobile device 'A' 420 located in the predetermined zone 415, and requests the profile, thereby receiving the profile as a response to the request.

The content delivering apparatus 410 may request the contents corresponding to the profile to be directly transmitted to the mobile device 'A' 420 when transmitting the received profile to the content providing apparatus 400.

The content providing apparatus 400, which receives the request, selects at least one content corresponding to the received profile among the previously stored contents, and directly transmits it to the mobile device 'A' 420.

Figure 6:
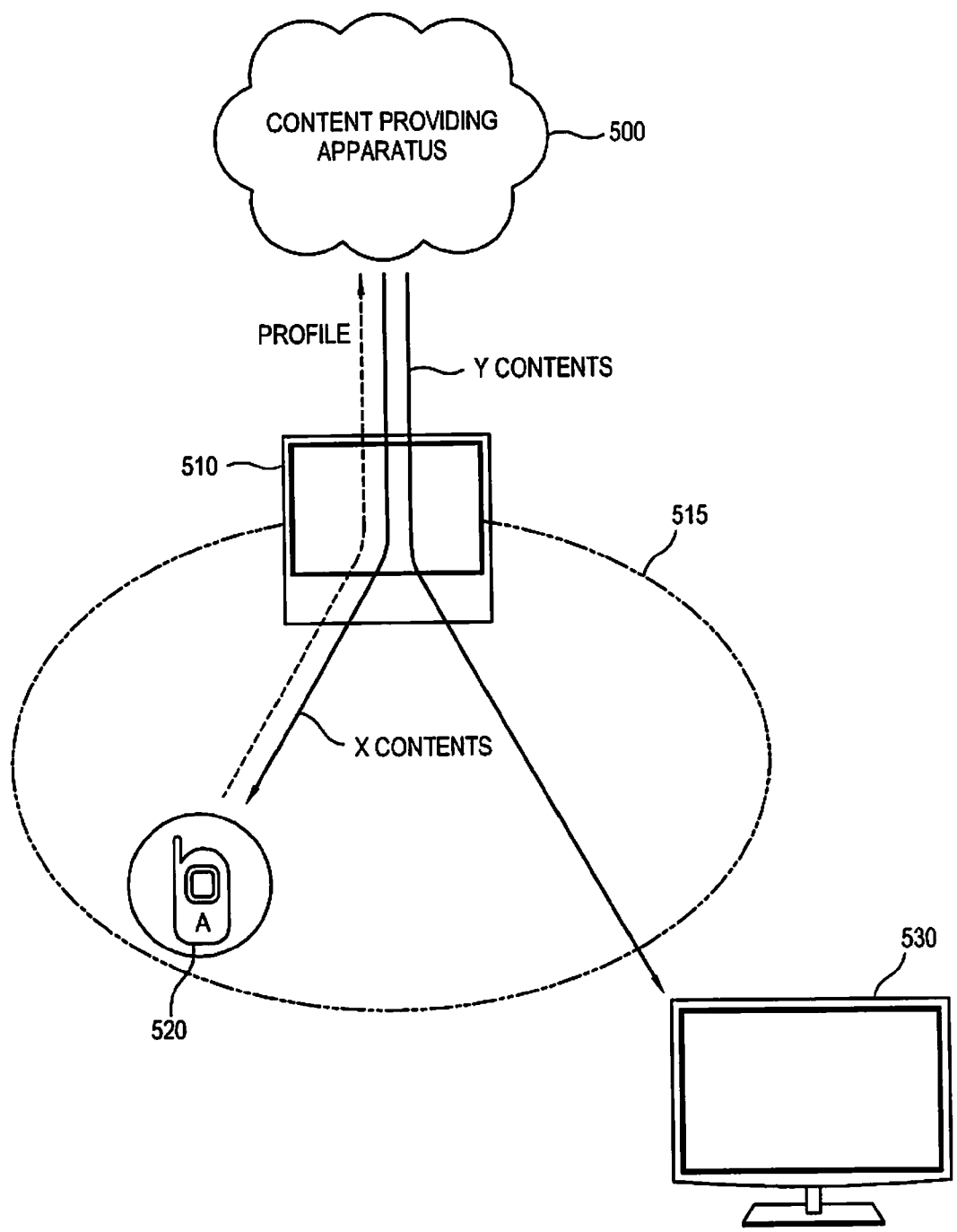
FIG. 6 is a diagram illustrating a content providing method, according to another embodiment of the present invention.

FIG. 6 is a diagram illustrating a content providing method, according to an additional embodiment of the present invention.

In this embodiment of the present invention, a content delivery apparatus 510 may transmit contents to at least one of a mobile device 'A' 520 and a peripheral device 530 connected to the mobile device 'A' 520 in accordance with the characteristics of the contents.

The content delivery apparatus 510 recognizes the mobile device 'A' 520 entering a predetermined zone 515 and requests a profile. The content delivery apparatus 510 may request information about the peripheral devices connected to the mobile device 'A' 520 in addition to the profile. In response to the request, the mobile device 'A' 520 may transmit its own profile and information about the peripheral devices connected thereto to the content delivery apparatus 510.

The content delivery apparatus 510 transmits the received profile of the mobile device 'A' 520 to a content providing apparatus 500, and also requests the contents corresponding to the profile from the content providing apparatus 500. The content providing apparatus 500 searches and selects at least one content corresponding to the received profile among the previously stored contents, and transmits the selected contents to the content delivery apparatus 510. In this embodiment of the present invention, the content delivery apparatus 510 receives X contents and Y contents from the content providing apparatus 500.

The X contents and the Y contents may have different characteristics. Specifically, the contents may be different in the amount, kind and subject of the contents. For example, the X contents may have a small amount, but the Y contents may have a large amount. The content delivery apparatus 510 may determine which device is to receive the contents on the basis of the profile of the mobile device 'A' 520 and the received information about the peripheral device. The content delivery apparatus 510 may transmit the X contents to the mobile device 'A' 520 since the mobile device generally has a limited storage capacity, and transmit the Y contents to a digital TV as the peripheral device 530 connected to the mobile device 'A' 520.

The content delivery apparatus 510 in this embodiment may optimally select and transmit the contents in accordance with characteristics of the contents.

Figure 7:
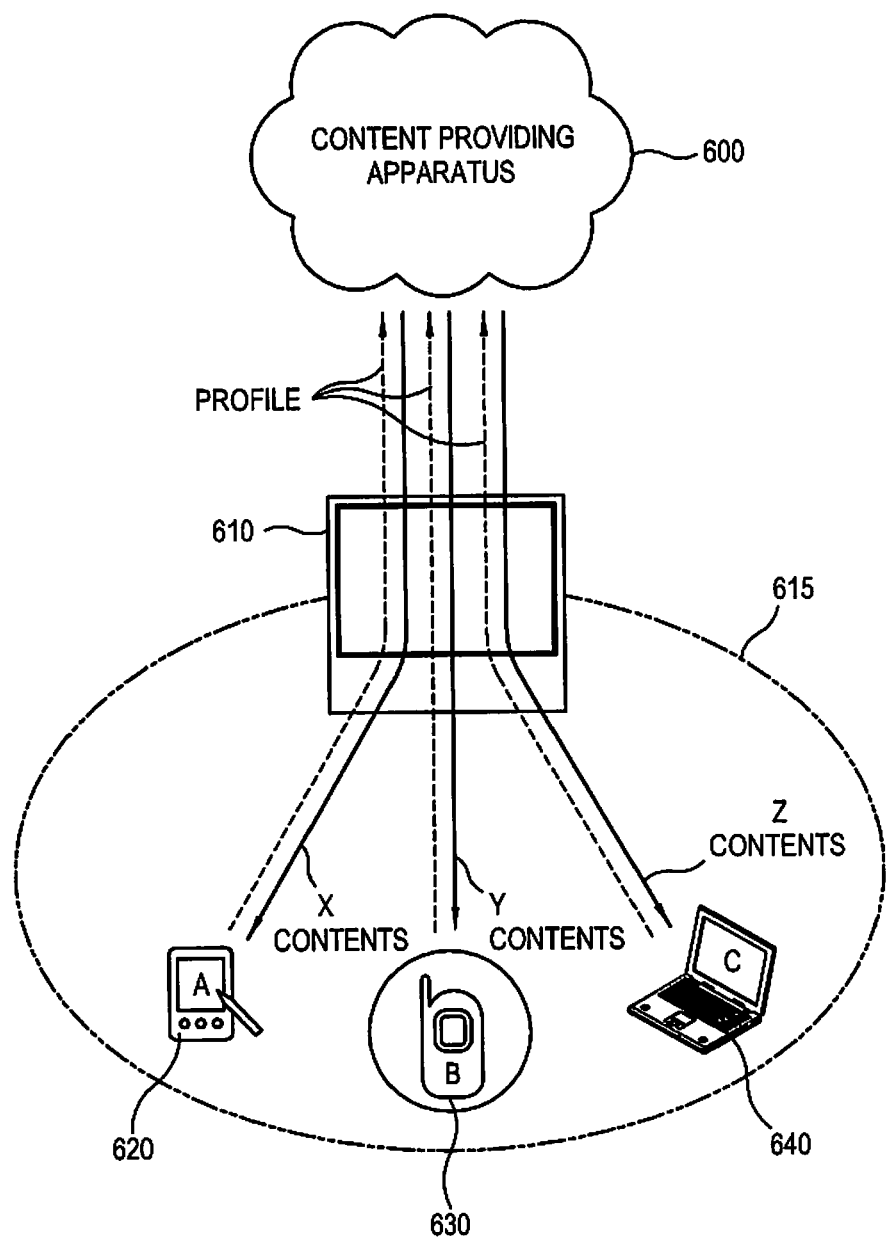
FIG. 7 is a diagram illustrating a content providing method, according to an additional embodiment of the present invention.

FIG. 7 is a diagram illustrating a content providing method, according to a further embodiment of the present invention.

According to this embodiment, a content delivery apparatus 610 may transmit different kinds of contents according to characteristics of mobile devices 620, 630 and 640.

The content delivery apparatus 610 recognizes a mobile device 'A' 620, a mobile device 'B' 630 and a mobile device 'C' 640 that enter a predetermined zone 615, and reads profiles thereof.

The mobile device 'A' 620, the mobile device 'B' 630 and the mobile device 'C' 640 may have different characteristics. For example, suppose that the mobile device 'A' 620, the mobile device 'B' 630 and the mobile device 640 'C' are a smart phone, a mobile terminal and a laptop computer, respectively. The content delivery apparatus 610 determines the characteristic of each mobile device on the basis of information included in the profile received from each mobile device.

Thus, the content delivery apparatus 610 request the contents corresponding to the profiles when transmitting the profiles received from the respective devices to a content providing apparatus 600. Three contents corresponding to the mobile device 'A' 620, four contents corresponding to the mobile device 'B' 630, and five contents corresponding to the mobile device 'C' 640 may be received from the content providing apparatus 600, for example. In the case of the mobile device 'A' 620, the content delivery apparatus 610 may transmit one content matching with the characteristic of the mobile device 'A' 620 among the three received contents to the mobile device 'A' 620 based on the determined characteristic of each mobile device. This may also be applied to the mobile device 'B' 630 and the mobile device 'C'.

When transmitting the profiles of each mobile device to the content providing apparatus 600, the content delivery apparatus 610 may request only the contents matching with the determined characteristic of each mobile device.

The content delivery apparatus 610 may process the received contents in accordance with the determined characteristics of each mobile device after receiving the contents corresponding to the profile of the respective mobile device from the content providing apparatus 600. For example, contents (e.g., a web page that contains all of a text, a moving picture and an image) to be transmitted to the mobile device 'A' 620, the mobile device 'B' 630 and the mobile device 'C' 640 are received from the content providing apparatus 600. If the mobile device 'A' 620 is determined as a Portable Multimedia Player (PMP) based on the determined characteristics of each mobile device, the content delivery apparatus 610 may select at least one (X contents) of a moving picture, an image and a text contained in the web page since web browsing is impossible in the PMP, and transmit the selected contents to the mobile device 'A' 620. If the mobile device 'B' 630 is determined as a mobile terminal, the content delivery apparatus 610 may select only at least one (Y contents) between a text and an image contained in the web page since the web browsing is impossible in the mobile terminal, and transmit it to the mobile device 'B' 630. When the mobile device 'C' 640 is determined as a laptop computer, the content delivery apparatus 610 may transmit URL (Z contents) of the web page to the mobile device 'C' 640 since the web browsing is possible in the laptop computer. In this embodiment, the content delivery apparatus can optimally transmit contents to the mobile device in which the content will be reproduced.

Figure 8:
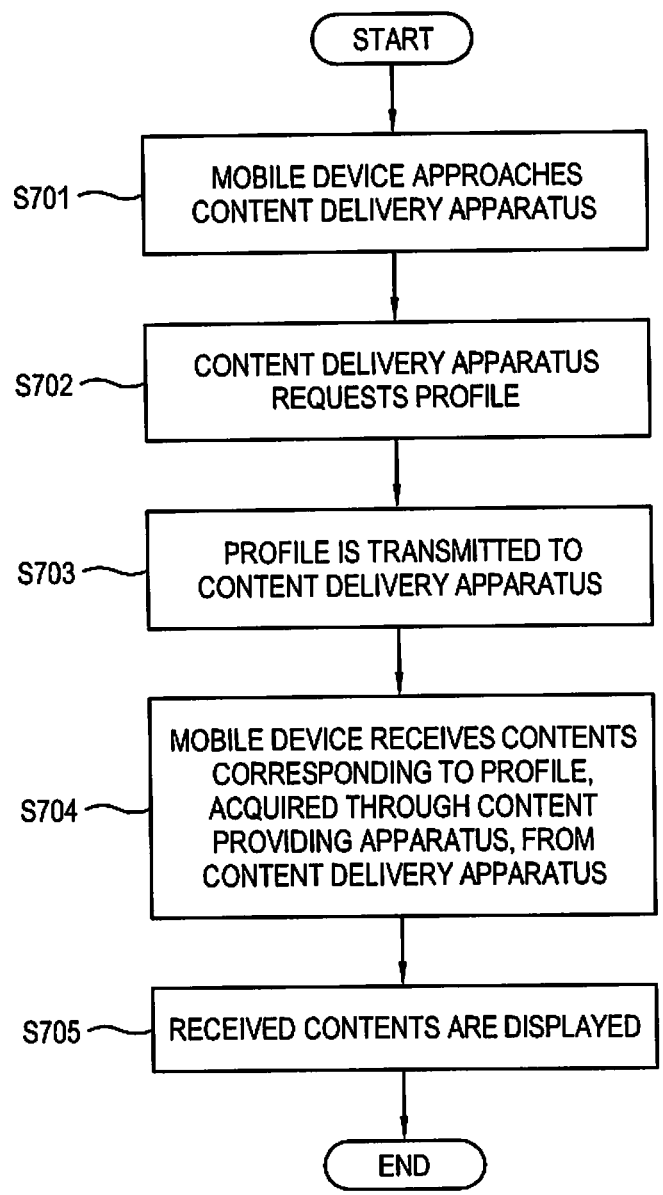
FIG. 8 is a flowchart illustrating control of the mobile device, according to an embodiment of the present invention.

FIG. 8 is a flowchart illustrating control of the mobile device, according to an embodiment of the present invention.

The mobile device 200 approaches the content delivery apparatus 300 in step S701. If the mobile device 200 enters a predetermined zone of the content delivery apparatus 300, the content delivery apparatus 300 recognizes the mobile device 200.

The mobile device 200 is requested to transmit its own profile by the content delivery apparatus 300 in step S702. The mobile device 200 transmits the profile to the content delivery apparatus 300 in step S703.

The mobile device 200 receives the contents corresponding to its profile, which are acquired from the content providing apparatus 100 by the content delivery apparatus 300, from the content delivery apparatus 300 in step S704.

The mobile device 200 displays the received contents in step S705.

Figure 9:
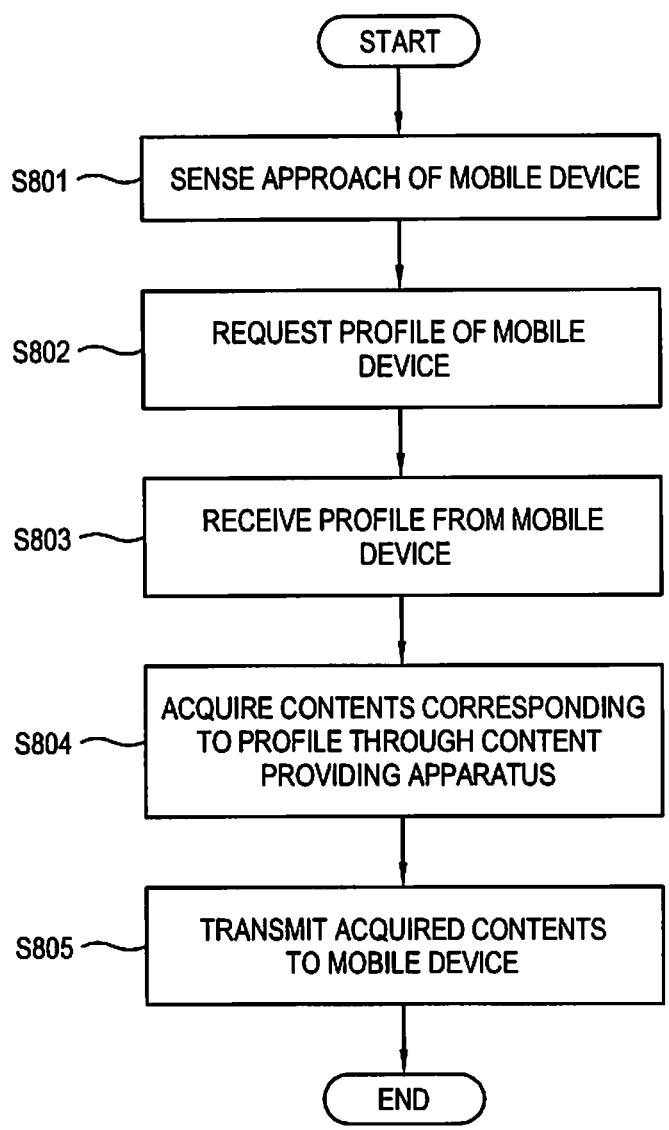
FIG. 9 is a flowchart illustrating control of the content delivery apparatus, according to an embodiment of the present invention.

FIG. 9 is a flowchart illustrating control of the content delivery apparatus, according to an embodiment of the present invention.

The content delivery apparatus 300 senses approach of the mobile device 200 in step S801. The content delivery apparatus 300 requests the profile of the mobile device 200 in step S802.

The content delivery apparatus 300 receives the profile from the mobile device 200 in step S803.

The content delivery apparatus 300 acquires the contents corresponding to the profile through the content providing apparatus 100 in step S804. The content delivery apparatus 300 transmits the acquired contents to the mobile device 200 in step S805.

Figure 10:
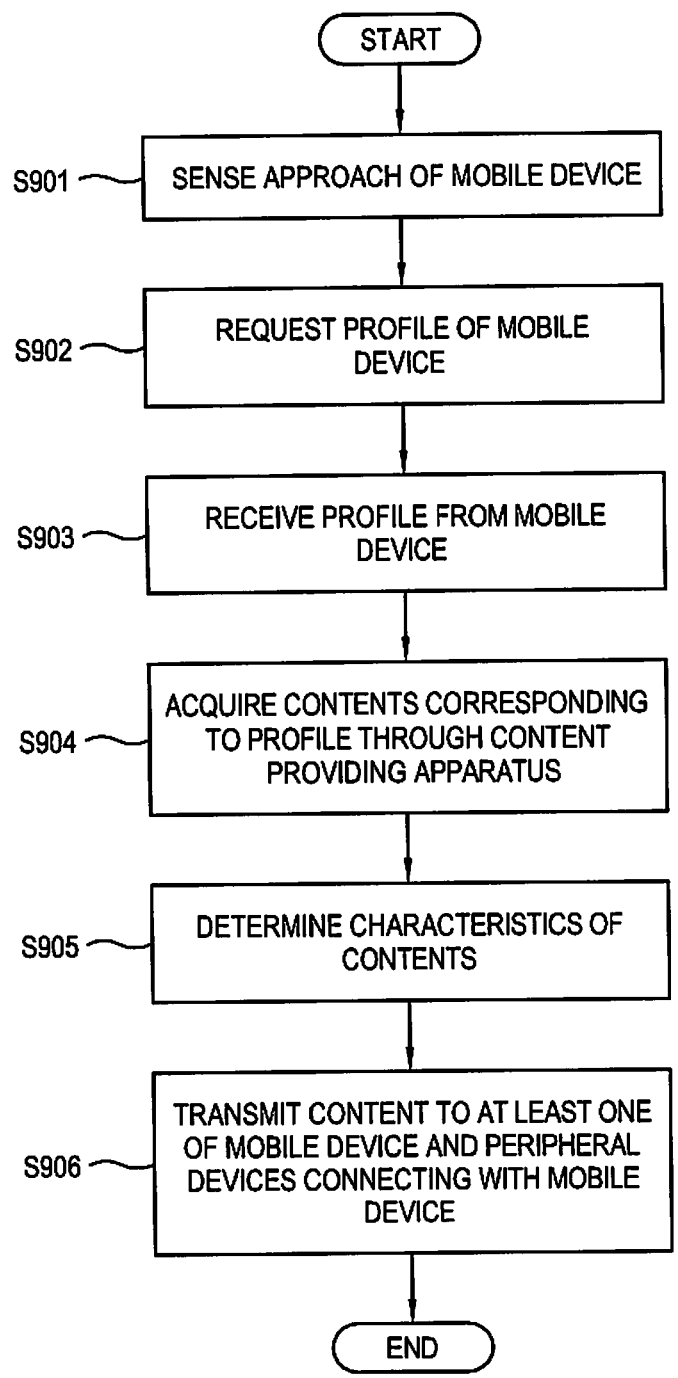
FIG. 10 is a flowchart illustrating control of the content delivery apparatus, according to another embodiment of the present invention.

FIG. 10 is a flowchart of controlling the content delivery apparatus, according to another embodiment of the present invention.

The content delivery apparatus 300 senses approach of the mobile device 200 in step S901. The content delivery apparatus 300 requests the profile of the mobile device 200 in step S902.

The content delivery apparatus 300 receives the profile from the mobile device 200 in step S903.

The content delivery apparatus 300 acquires the contents corresponding to the profile through the content providing apparatus 100 in step S904.

The content delivery apparatus 300 determines the characteristics of the acquired contents in step S905. Specifically, the acquired contents may be different from each other with regard the amount, the kind and the subject. The content delivery apparatus 300 selects the device proper for the characteristics of the contents.

In accordance with the selection, the content delivery apparatus 300 transmits the contents to at least one of the mobile device 200 and the peripheral devices connecting with the mobile device 200 in step S906.

Figure 11:
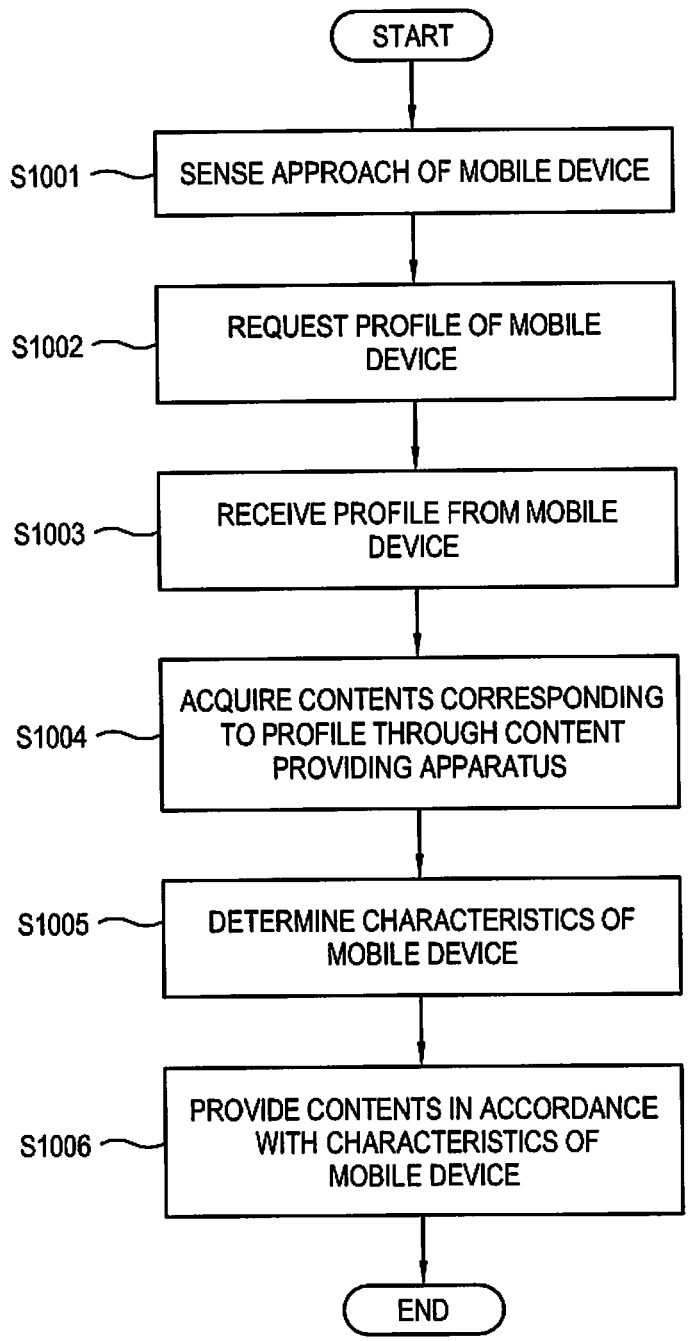
FIG. 11 is a flowchart illustrating control of the content delivery apparatus, according to an additional embodiment of the present invention.

FIG. 11 is a flowchart illustrating control of the content delivery apparatus, according to still another embodiment of the present invention.

The content delivery apparatus 300 senses approach of the mobile device 200 in step S1001. The content delivery apparatus 300 requests the profile of the mobile device 200 in step S1002.

The content delivery apparatus 300 receives the profile from the mobile device 200 in step S1003.

The content delivery apparatus 300 acquires the contents corresponding to the profile through the content providing apparatus 100 in step S1004.

The content delivery apparatus 300 determines the characteristics of the mobile device 200 that will receive the acquired contents in step S1005. Specifically, the mobile devices 200 may be different in characteristics such as the kind, a version, a model number, etc. from one another. In this case, the content delivery apparatus 300 selects the contents proper for the characteristics of the mobile device 200.

In accordance with the selection, the content providing apparatus 300 transmits the contents in accordance with the characteristics of the mobile device 200 in step S1006.

Figure 12:
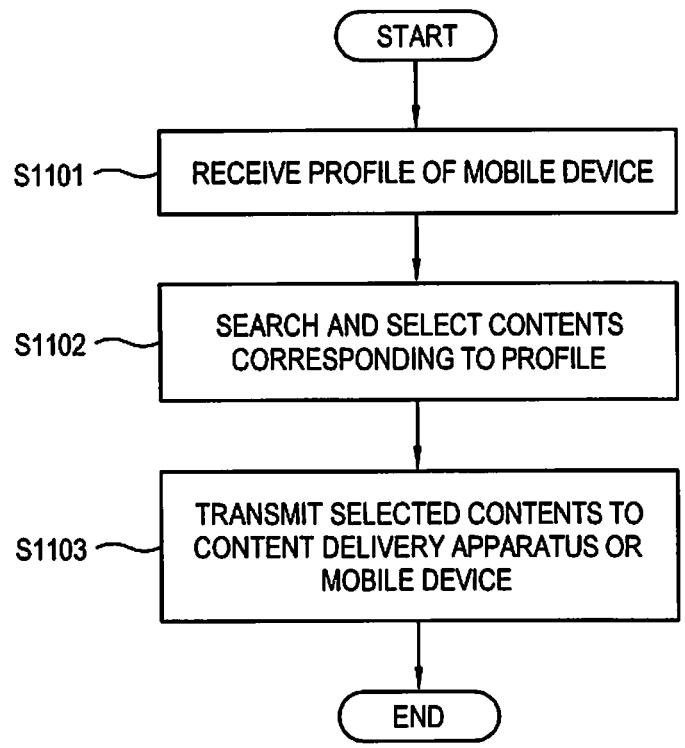
FIG. 12 is a flowchart illustrating control of the content providing apparatus, according to an embodiment of the present invention.

FIG. 12 is a flowchart illustrating control of the content providing apparatus, according to an embodiment of the present invention.

The content providing apparatus 100 receives the profile of the mobile device 200 from the content delivery apparatus 300 in step S1101. Further, the content providing apparatus 100 receives a request for the contents corresponding to the profile from the content delivery apparatus 300 together. At this time, it may be requested from the content delivery apparatus 300 that the contents corresponding to the profile are directly transmitted to the mobile device 200.

The content providing apparatus 100 searches and selects the contents corresponding to the received profile among the previously stored contents in step S1102.

The selected contents are transmitted to the content delivery apparatus 300. Also, if the content delivery apparatus 300 is requested to directly transmit the content to the mobile device 200, the content delivery apparatus 300 directly transmits the selected contents to the mobile device 200 in step S1103.

As described above, there are provided a mobile device, a content delivery apparatus, a content providing apparatus and a control method thereof, in which customized contents can be provided to the mobile device on the basis of a user's profile.

While the invention has been shown and described with reference to certain embodiments thereof, it will be understood by those skilled in the art that changes in form and detail may be made therein without departing from the spirit and scope of the invention as defined in the appended claims and their equivalents.

What is claimed is:
1. A mobile device comprising:
  a communication unit configured to communicate with a content delivery apparatus; and
  a controller configured to control the communication unit to transmit a user profile stored on the mobile device, corresponding to a request, to a content delivery apparatus, when the request for the user profile is received from the content delivery apparatus located within a predetermined zone, and to receive content corresponding to the user profile, wherein the user profile is transmitted, through the content delivery apparatus, to an external server, the content is stored on the external server, and the content corresponding to the user profile is transmitted, through the content delivery apparatus, to at least one of the mobile device and one or more peripheral devices connected to the mobile device in accordance with characteristics of the content, and wherein in response to the characteristics of the content being acceptable in the mobile device, the controller controls the communication unit to receive the content, and in response to the characteristics of the content being not acceptable in the mobile device, the controller controls the communication unit not to receive the content.

2. The mobile device according to claim 1, wherein the controller controls the communication unit to receive the content corresponding to the profile from the content delivery apparatus, wherein the content delivery apparatus acquires the content corresponding to the profile through a content providing apparatus, which comprises at least one content.

3. The mobile device according to claim 1, wherein the controller controls the communication unit to receive the content corresponding to the profile from a content providing apparatus, which comprises at least one content and receives the profile from the content delivery apparatus.

4. The mobile device according to claim 1, wherein the controller controls the communication unit to transmit the profile to a content providing apparatus, which comprises at least one content.

5. The mobile device according to claim 4, wherein, when the profile is changed, the controller controls the communication unit to transmit the changed profile to the content providing apparatus.

6. The mobile device according to claim 1, wherein the controller determines whether to receive the content in accordance with the characteristics of the content.

7. The mobile device according to claim 6, wherein the characteristics of the content comprise at least one of an amount of the content, a kind of content, and a subject of the content.

8. The mobile device according to claim 1, wherein the profile comprises at least one of a preference of a user, an interest of the user, private information of the user, and characteristic information of the mobile device.

9. The mobile device according to claim 1, wherein the content comprises at least one of an advertisement, a Graphic User Interface (GUI) linked to another content, a moving picture, an image, an audio and a text.

10. The mobile device according to claim 9, wherein the content comprises content related to an image being displayed in the content delivery apparatus.

11. The mobile device according to claim 1, wherein in response to the mobile device being connected to the peripheral device, the controller controls the communication unit to transmit information on the peripheral device to the content delivery apparatus.

12. A content delivery apparatus comprising:
a communication unit configured to communicate with a mobile device;
and
a controller configured to controls the communication unit to request and receive a user profile from a mobile device when the mobile device is sensed within a predetermined zone, and to transmit the received user profile to a content providing apparatus, which comprises at least one content, wherein the content corresponding to the user profile is received from the content providing apparatus and transmitted, through the content delivery apparatus, to at least one of the mobile device and one or more peripheral devices connected to the mobile device in accordance with characteristics of the content, and wherein in response to the characteristics of the content being acceptable in the mobile device, the controller controls the communication unit to receive the content, and in response to the characteristics of the content being not acceptable in the mobile device, the controller controls the communication unit not to receive the content.

13. The content delivery apparatus according to claim 12, wherein the controller controls the communication unit to receive content, corresponding to the profile, from the content providing apparatus, and to transmit the received content to the mobile device.

14. The content delivery apparatus according to claim 13, wherein the controller controls the communication unit to transmit the content to at least one of the mobile device and a peripheral device connected to the mobile device, in accordance with the characteristics of the content.

15. The content delivery apparatus according to claim 14, wherein the characteristics of the content comprise at least one of an amount of the content, a kind of content, and a subject of the content.

16. The content delivery apparatus according to claim 13, wherein the controller controls the communication unit to transmit different kinds of content corresponding to characteristics of the mobile device.

17. The content delivery apparatus according to claim 12, wherein, when the profile of the mobile device is transmitted to the content providing apparatus, the controller controls the communication unit to request content corresponding to the profile and transmit a signal for requesting that the content be directly transmitted to the mobile device.

18. The content delivery apparatus according to claim 12, wherein the profile comprises at least one of a preference of a user, an interest of the user, private information of the user, and characteristic information of the mobile device.

19. The content delivery apparatus according to claim 12, wherein the content comprises at least one of an advertisement, a Graphic User Interface (GUI) linked to another content, a moving picture, an image, an audio and a text.

20. The mobile device according to claim 12, wherein the controller controls the communication unit to request the content providing apparatus to transmit content related to an image being displayed in the display unit from among content corresponding to the received profile.

21. The content delivery apparatus according to claim 12, wherein in response to the mobile device being connected to the peripheral device, the controller controls the communication unit to receive information on the peripheral device from the mobile device.

22. A content providing apparatus comprising:
a communication unit configured to communicate with a content delivery apparatus;
a storage unit that stores at least one content; and
a controller that controls the storage unit to store a user profile of a mobile device when the user profile is received from a content delivery apparatus through the communication unit, and to select content corresponding to the user profile from among the stored at least one content, wherein the user profile is transmitted, through the content delivery apparatus, from a mobile device, the content corresponding to the user profile is transmitted, through the content delivery apparatus, to at least one of the mobile device and one or more peripheral devices connected to the mobile device in accordance with characteristics of the content, and wherein in response to the characteristics of the content being acceptable in the mobile device, the controller controls the communication unit to receive the content, and in response to the characteristics of the content being not acceptable in the mobile device, the controller controls the communication unit not to receive the content.

23. The content providing apparatus according to claim 22, wherein the controller controls the communication unit to transmit the selected content to the content delivery apparatus.

24. The content providing apparatus according to claim 22, wherein the controller controls the communication unit to transmit the selected content to the mobile device when the content delivery apparatus requests to transmit content corresponding to the profile.

25. The content providing apparatus according to claim 22, wherein, when selecting content corresponding to the profile, the controller selects a kind of content based on characteristic information of the mobile device contained in the profile.

26. The content providing apparatus according to claim 22, wherein in response to the mobile device being connected to the peripheral device, the controller controls the communication unit to receive information on the peripheral device, through the content delivery apparatus, from the mobile device.

27. A method of controlling a mobile device, the method comprising the steps of:
receiving a request for a user profile from a content delivery apparatus located in a predetermined zone;
transmitting the user profile to the content delivery apparatus;
receiving content corresponding to the user profile; and
displaying the received content,
wherein the user profile is transmitted, through the content delivery apparatus, to an external server, the content is stored on the external server, and the content corresponding to the user profile is transmitted, through the content delivery apparatus, to at least one of the mobile device and one or more peripheral devices connected to the mobile device in accordance with characteristics of the content, and
wherein in response to the characteristics of the content being acceptable in the mobile device, a controller controls a communication unit to receive the content, and in response to the characteristics of the content being not acceptable in the mobile device, the controller controls the communication unit not to receive the content.

28. The method according to claim 27, wherein receiving the content comprises receiving the content corresponding to the profile from the content delivery apparatus, which acquires the content corresponding to the profile through a content providing apparatus comprising at least one content.

29. The method according to claim 27, wherein receiving the content comprises receiving the content corresponding to the profile from a content providing apparatus, which comprises at least one content and receives the profile from the content delivery apparatus.

30. The method according to claim 27, further comprising transmitting the profile to a content providing apparatus comprising at least one content.

31. The method according to claim 30, further comprising transmitting a changed profile to the content providing apparatus if the profile is changed.

32. The method according to claim 27, further comprising determining whether to receive the content in accordance with the characteristics of the content.

33. The method according to claim 32, wherein the characteristics of the content comprise at least one of an amount of the content, a kind of content, and a subject of the content.

34. The method according to claim 27, wherein the profile comprises at least one of a preference of a user, an interest of the user, private information of the user, and characteristic information of the mobile device.

35. The method according to claim 27, wherein the content comprises at least one of an advertisement, a Graphic User Interface (GUI) linked to another content, a moving picture, an image, an audio and a text.

36. The method according to claim 35, wherein the content comprises content related to an image being displayed in the content delivery apparatus.

37. The method according to claim 27, wherein the transmitting the user profile to the content delivery apparatus comprises in response to the mobile device being connected to the peripheral device, transmitting information on the peripheral device to the content delivery apparatus.

38. A method of controlling a content delivery apparatus, the method comprising the steps of:
determining whether a mobile device is sensed within a predetermined zone;
requesting a user profile of the mobile device, when the mobile device is sensed within the predetermined zone;
receiving the user profile from the mobile device; and
transmitting the received user profile to a content providing apparatus that comprises at least one content,
wherein the content corresponding to the user profile is received from the content providing apparatus and transmitted, through the content delivery apparatus, to at least one of the mobile device and one or more peripheral devices connected to the mobile device in accordance with characteristics of the content, and
wherein in response to the characteristics of the content being acceptable in the mobile device, a controller controls a communication unit to receive the content, and in response to the characteristics of the content being not acceptable in the mobile device, the controller controls the communication unit not to receive the content.

39. The method according to claim 38, further comprising receiving content corresponding to the profile from the content providing apparatus; and transmitting the received content to the mobile device.

40. The method according to claim 39, wherein transmitting the received content comprises transmitting the content to at least one of the mobile device and a peripheral device connected to the mobile device in accordance with the characteristics of the content.

41. The method according to claim 40, wherein the characteristics of the content comprise at least one of an amount of the content, a kind of content, and a subject of the content.

42. The method according to claim 39, wherein transmitting the received content comprises transmitting different kinds of content corresponding to characteristics of the mobile device.

43. The method according to claim 39, wherein the content comprises at least one of an advertisement, a Graphic User Interface (GUI) linked to another content, a moving picture, an image, an audio and a text.

44. The method according to claim 38, wherein transmitting the received profile comprises providing a request for content corresponding to the profile together with the profile of the mobile device, and requesting the content providing apparatus to transmit the requested content to the mobile device.

45. The method according to claim 38, wherein the profile comprises at least one of a preference of a user, an interest of the user, private information of the user, and characteristic information of the mobile device.

46. The method according to claim 38, further comprising requesting content related to an image being displayed in a display unit to be transmitted among content corresponding to the received profile.

47. The method according to claim 38, wherein the receiving the user profile from the mobile device comprises in response to the mobile device being connected to the peripheral device, receiving information on the peripheral device from the mobile device.

48. A method of controlling a content providing apparatus, the method comprising the steps of:
 storing at least one content in a storage unit;
 receiving a user profile of a mobile device from a content delivery apparatus through a communication unit;
 storing the received user profile in the storage unit; and
 selecting content corresponding to the received user profile among the stored at least one content,
 wherein the user profile is transmitted, through the content delivery apparatus, from the mobile device, the content corresponding to the user profile is transmitted, through the content delivery apparatus, to at least one of the mobile device and one or more peripheral devices connected to the mobile device in accordance with characteristics of the content, and
 wherein in response to the characteristics of the content being acceptable in the mobile device, controller controls the communication unit to receive the content, and in response to the characteristics of the content being not acceptable in the mobile device, the controller controls the communication unit not to receive the content.

49. The method according to claim 48, further comprising transmitting the selected content to the content delivery apparatus.

50. The method according to claim 48, wherein receiving the profile comprises: receiving a request from the content delivery apparatus to transmit the content corresponding to the profile to the mobile device; and transmitting the selected content to the mobile device.

51. The method according to claim 48, wherein the selecting the content comprises selecting a kind of content based on characteristic information of the mobile device contained in the profile.

52. The method according to claim 48, wherein the receiving a user profile of a mobile device from a content delivery apparatus comprises receiving information on the peripheral device, through the content delivery apparatus, from the mobile device.

* * * * *